United States Patent [19]

Fox

[11] 4,314,832

[45] Feb. 9, 1982

[54] AIR CLEANER WITH CARTRIDGE SUSPENSION

[75] Inventor: Michael E. Fox, Minneapolis, Minn.

[73] Assignee: Donaldson Company, Inc., Minneapolis, Minn.

[21] Appl. No.: 171,658

[22] Filed: Jul. 24, 1980

[51] Int. Cl.³ .................... B01D 46/52; B01D 50/00
[52] U.S. Cl. ........................ 55/482; 55/498; 55/502; 55/508; 55/510
[58] Field of Search ............ 55/482, 498, 502, 510, 55/508

[56] References Cited

U.S. PATENT DOCUMENTS

| | | | |
|---|---|---|---|
| 2,959,248 | 11/1960 | Thornburgh | 55/498 X |
| 3,095,290 | 6/1963 | Hockett | 55/502 |
| 3,226,917 | 1/1966 | Donovan et al. | 55/502 X |
| 3,290,870 | 12/1966 | Jensen | 55/502 X |
| 3,488,928 | 1/1970 | Tarala | 55/498 X |
| 3,672,130 | 6/1972 | Sullivan et al. | 55/498 X |
| 3,745,753 | 7/1973 | Risse | 55/502 X |
| 3,747,303 | 7/1973 | Jordan | 55/498 X |
| 4,007,026 | 2/1977 | Groh | 55/302 |
| 4,128,251 | 12/1978 | Gaither et al. | 55/502 X |
| 4,135,899 | 1/1979 | Gauer | 55/482 |
| 4,159,197 | 6/1979 | Schuler et al. | 55/379 |

*Primary Examiner*—Kathleen J. Prunner
*Attorney, Agent, or Firm*—Merchant, Gould, Smith, Edell, Welter & Schmidt

[57] ABSTRACT

An air cleaner including a support member (11) having an axis (15), an axial air flow connection (12), and mounting structure (26, 31) extending along the axis for applying compressive force toward said connection; a hollow outer filter cartridge (16) having ends (41) with flexible lips (43) extending radially inward with respect to the axis; a hollow inner filter cartridge (17) carried by the support member and having flat surfaces extending transversely with respect to the axis; and clamping apparatus (21-23) for cooperating with the mounting structure to secure the inner filter cartridge to the support member, the support member and the clamping apparatus having further flat surfaces (24, 44) opposed to the flat surfaces of the inner filter cartridge, for cooperating therewith to grip the lips of the outer filter cartridge so as to suspend the latter from the support member.

6 Claims, 3 Drawing Figures

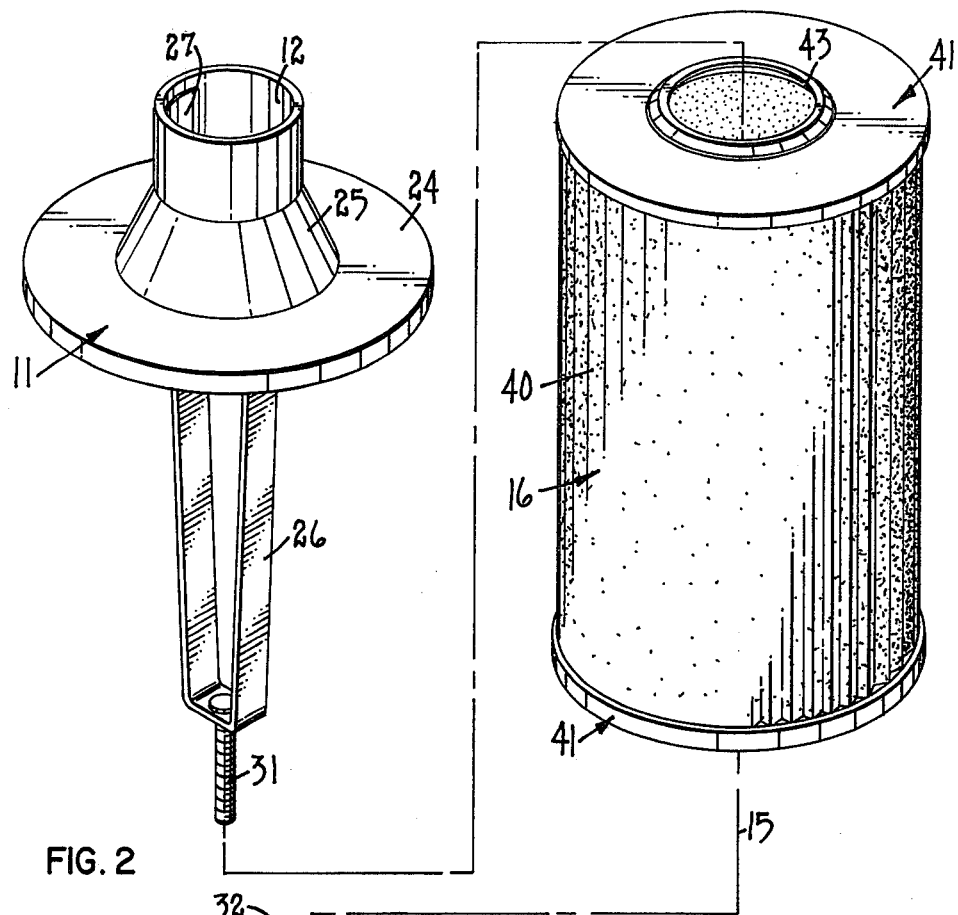
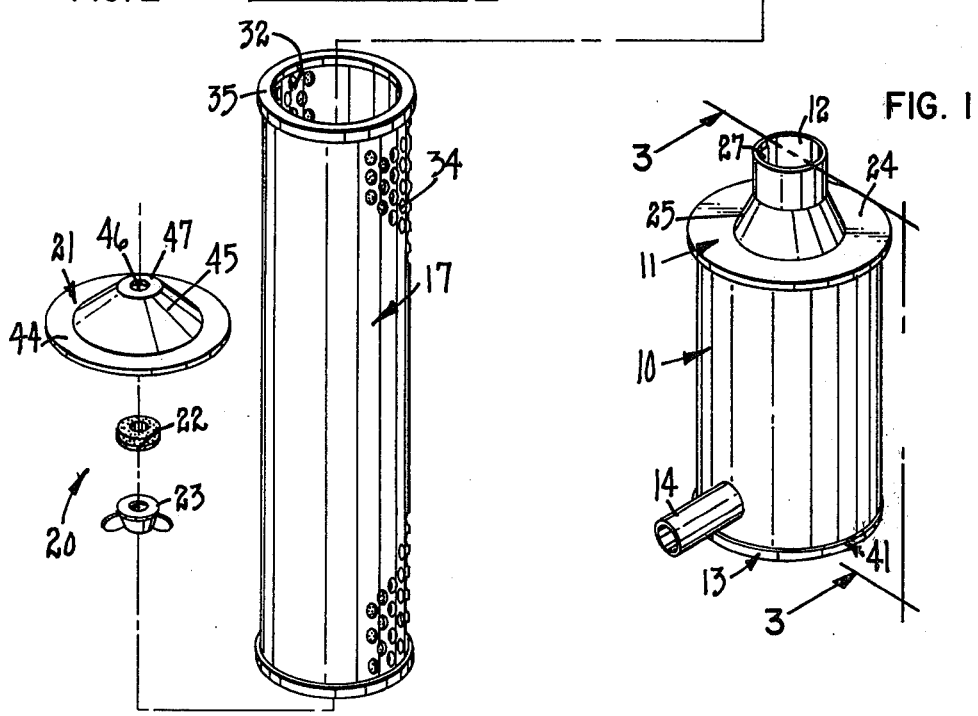
FIG. 2
FIG. 1

AIR CLEANER WITH CARTRIDGE SUSPENSION

TECHNICAL FIELD

This invention relates to the field of air cleaners having replaceable filter cartridges, and particularly to such cleaners having both principal and safety filter functions so that the engine or other device being supplied with cleaned air is not directly open to the ambient atmosphere even if a principal filter undergoes catastrophic failure.

BACKGROUND OF PRIOR ART

An air cleaner for the contemplated use conventionally comprises a housing having air inlet and outlet ports, an outer, principal filter cartridge and an inner, safety filter cartridge. Typically, the outlet port is central or axial, and air flows inward radially through the cartridges. The latter are usually mounted in the housing by means of a central support yoke, being clamped between an end of the housing and a closure member centrally traversed by an extension of the yoke.

This is a sturdy and practical arrangement, and one which is quite satisfactory when the filter cartridges are substantial enough to tolerate the necessary axial compressive forces without deterioration. For this purpose, the filter cartridges, in which the medium itself may be pleated paper, are so constructed that the paper is contained between inner and outer cylindrical supporting and protective shells of perforated metal, extending between end caps like the paper medium itself.

It is becoming increasingly desirable, however, to make at least the principal filter cartridge without the perforated metal shells. These cartridges are simply replaced and discarded when they become filled with dirt, and the cost of this procedure is considerably increased if metal shells must be discarded with the paper medium. Since the safety filters seldom need replacement, the expense of providing them with inner and outer shells is not intolerable.

BRIEF SUMMARY OF THE INVENTION

The present invention comprises an arrangement by which a principal filter cartridge of pleated paper is supported in the housing of an air cleaner without being subjected to axial compression. This is accomplished by providing the cartridge with at least one end cap having a flexible lip extending radially, to be clamped between a surface fixed to the housing and a surface of the safety filter cartridge, when the latter is secured in position in the housing. It is convenient to make principal filter cartridges symmetrical so that both ends have the flexible lips, and provision is also made for clamping the second lip of each principal filter cartridge against the adjacent end of the safety filter cartridge.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWING

In the drawing, wherein like reference numerals indicate corresponding parts throughout the several views, FIG. 1 is a general view in perspective of a filter according to the invention;

FIG. 2 is an exploded view of the device of FIG. 1, parts being omitted; and

DESCRIPTION OF THE PREFERRED EMBODIMENT

Figure 3:
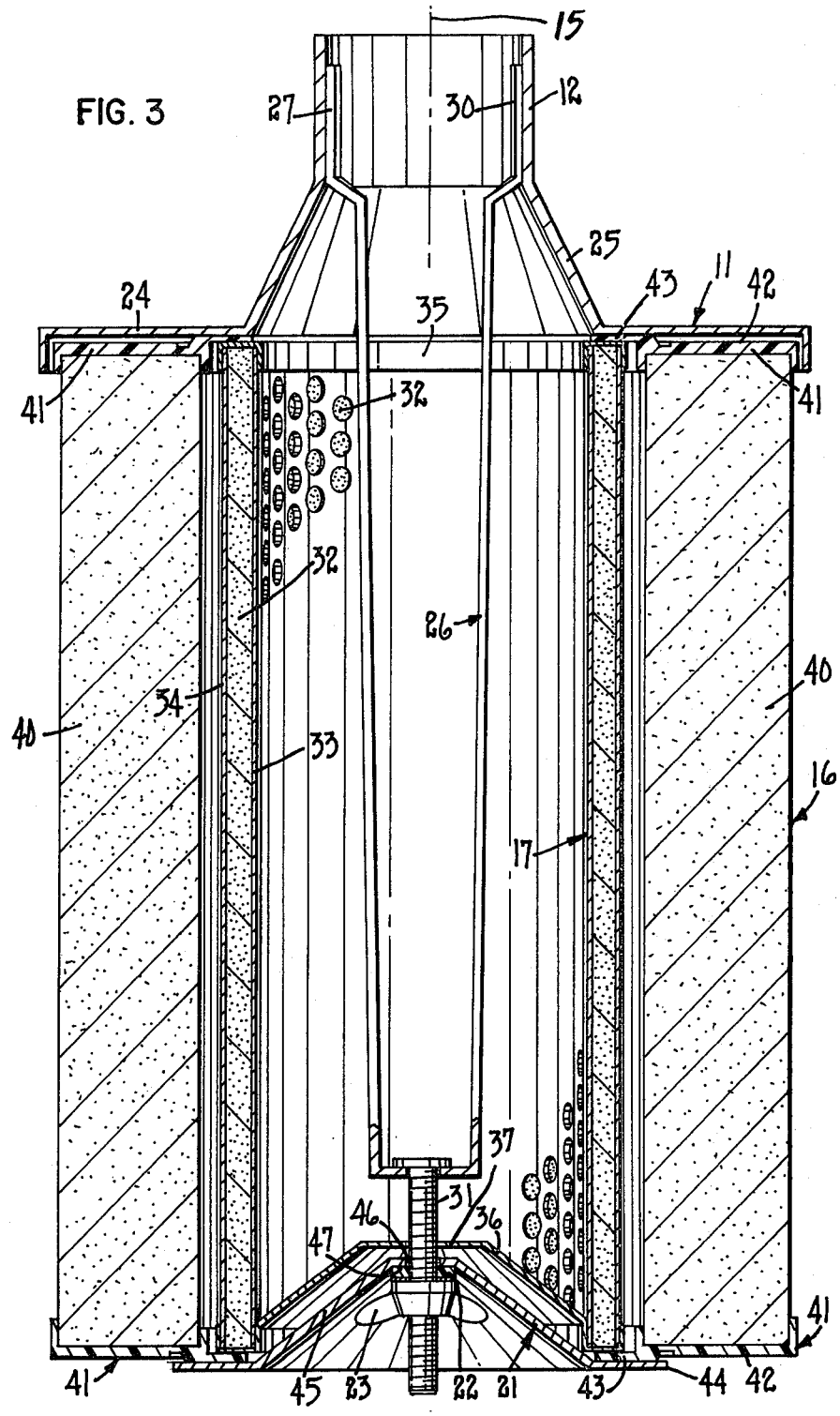
FIG. 3 is a longitudinal axial section of the filter assembly, seen along the line 3—3 of FIG. 1.

As shown in FIG. 1, a filter according to the invention may comprise a housing 10 having a support member or end cap 11 with an axial outlet connection 12, and a hollow body 13 having an inlet connection 14 for admitting air laterally to the housing: the air inlet may be either radial or tangential, as desired. Body 13 is removably secured to end cap 11 in any conventional fashion: for some applications body 13 may even be omitted.

The structure is symmetrical about a preferably vertical axis 15, and further includes a filter assembly comprising, with end cap 11, a principal filter cartridge 16, a safety filter cartridge 17, and mounting means 20 including a plate 21, a gasket washer 22, and a wing nut 23 which may be captive to washer 22. If desired, plate 21 may be the substantially closed lower end of body 13.

End cap 11 comprises a flat surface 24 perpendicular to axis 15 and joined to outlet 12 by a flairing portion 25. A support member or mounting yoke 26 for the filter cartridges is of generally U-shaped configuration, and has portions 27 and 30 secured as by welding within outlet 12. Yoke 26 extends along axis 15 away from connection 12 and terminates in a threaded stud 31.

Safety filter cartridge 17 comprises a hollow cylinder of pleated paper filter medium 32, the pleats running parallel to axis 15, and being confined between inner and outer cylinders or shells 33 and 34 of perforated sheet metal, of sufficiently heavy gauge to withstand considerable compressive force along axis 15. The upper end of cartridge 17 is completed by an annulus 35 of metal, while the lower end is completed by a disk 36 of metal having a central aperture 37 to pass stud 31. Members 32–36 may be assembled mechanically or may be secured adhesively.

Principal filter cartridge 16 comprises a hollow cylinder of pleated paper filter medium 40, the pleats as in cylinder 32 running parallel to axis 15. The ends of the pleats are molded into identical end members 41, and no perforated metal inner or outer shell is provided. Each of the end members is of dual durometer construction: an outer, relatively rigid portion 42 is integral with an inner, somewhat thinner and very flexible lip portion 43. Such a cartridge is self-supporting and may be handled with reasonable care, but is not capable of resisting strong compressive forces applied axially thereto.

Plate 21 has a flat surface 44 and a bell 45 with a central opening 46, to pass stud 31, surrounded by a bearing surface 47 for washer 22.

OPERATION

To assemble a filter according to the invention, a safety filter cartridge 17 is inserted axially into a principal filter cartridge 16, by deforming lips 43, until annulus 35 engages the inner surface of one lip 43, and disk 36 engages the inner surface of the other lip 43. The assembly is passed over mounting yoke 26 so that stud 31 projects through opening 46, and washer 22 and wing nut 23 are applied to the stud. FIG. 3 shows that when wing nut 23 is tightened, one of lips 43 is gripped between annulus 35 and flat surface 24, and the other lip 43 is gripped between disk 36 and flat surface 44. The longitudinal dimensions of the cartridges are such that secure gripping of the lips occurs without application of any appreciable compressive force to cartridge 16, which is simply suspended on lips 43. Body 13 may now be attached to end cap 11. When suction is applied at outlet 12, air is drawn through inlet 14 into housing 10, and airborne particulate matter is trapped on the outer surface of cartridge 16.

When it is desired to replace cartridge 16 body 13 is removed, wing nut 23 is loosened and removed, and the cartridges are extracted as a unit, cartridge 16 being discarded and replaced by a fresh cartridge as described above. When reassembled, the filter is again ready for service.

If desired, member 21 may be replaced by the closed end of body 13, which must then be provided with an aperture and bell for reception of stud 31 and washer 22.

From the foregoing it will be evident that I have invented a filtering apparatus in which no compressive force is applied to a principal filter, so that longitudinal strengthening elements may be omitted therefrom.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An air cleaner comprising, in combination:
   a support member having an axis, an axial air flow connection, and mounting means extending along said axis for applying compressive force in a direction generally towards said connection;
   a first hollow filter cartridge having a first flat surface;
   clamping means constructed and arranged to cooperate with said mounting means for securing said first filter cartridge to said support member with said flat surface extending generally transversely with respect to said axis;
   a second hollow filter cartridge having an end with a radially extending lip; and
   a second flat surface on one of said support member and said clamping means, said second flat surface apposed to said first flat surface, said lip being disposed between said flat surfaces such that said flat surfaces cooperate to grip therebetween said lip of said second filter cartridge so as to suspend said second filter cartridge from said support member.

2. An air cleaner comprising, in combination:
   a support member having an axis and an axial air flow connection;
   a hollow inner filter cartridge having a first flat surface extending transversely with respect to said axis;
   means for mounting said inner filter cartridge to said support member, said mounting means extending along said axis and including clamping means for applying compressive force to said inner filter cartridge in a direction generally towards said air flow connection;
   a hollow outer filter cartridge having an end with a lip extending radially inward; and
   said support member having a second flat surface apposed to and cooperating with said inner filter cartridge first flat surface to grip therebetween said lip of said outer filter cartridge so as to suspend the latter from said support member without compressive force being applied to said outer filter cartridge.

3. An air cleaner comprising, in combination:
   a support member having an axis and an axial air flow connection;
   a hollow inner filter cartridge having an axis and being carried by said support member and having a first flat surface extending transversely with respect to said axis of said inner filter cartridge;
   means for mounting said inner filter cartridge to said support member, said mounting means extending along said axis of said support member and including means for applying compressive force in a direction generally towards said air flow connection;
   said means for applying compressive force comprising clamping means constructed and arranged to cooperate with said mounting means to secure said inner filter cartridge to said support member coaxially therewith; and
   a hollow outer filter cartridge having an end with a lip extending radially inward with respect to an axis thereof;
   said clamping means having a second flat surface apposed to said first flat surface, said lip being disposed between said flat surfaces such that said flat surfaces cooperate to grip therebetween said lip of said outer filter cartridge so as to suspend said outer filter cartridge from said support member coaxially therewith without applying a compressive force to said outer filter cartridge.

4. An air cleaner comprising, in combination:
   a support member having an axis and an axial air flow connection;
   a hollow inner filter cartridge having an axis and being carried by said support member coaxially therewith and having first and second opposed, spaced apart flat surfaces extending transversely with respect to said axis of said inner filter cartridge;
   means for mounting said inner filter cartridge to said support member, said mounting means extending along said axis of said support member and including means for applying compressive force in a direction generally towards said air flow connection;
   said means for applying compressive force comprising clamping means constructed and arranged to cooperate with said mounting means to secure said inner filter cartridge to said support member; and
   a hollow outer filter cartridge having opposed ends with flexible lips extending radially inward with respect to an axis thereof;
   said support member and said clamping means each having a flat surface apposed to a respective flat surface of said inner filter cartridge, said lips of said outer filter cartridge being disposed between the apposed flat surfaces such that the apposed flat surfaces cooperate to grip therebetween a respective lip of said outer filter cartridge so as to suspend said outer filter cartridge from said support member coaxially therewith without applying any compressive force to said outer filter cartridge.

5. An air cleaner comprising, in combination:
a support having an axis, an axial air flow conduit, means for applying compressive force, said means extending along said axis, and a first flat surface extending generally transversely of said axis;
a first hollow filter cartridge including a first end having a second flat surface in apposition with said first flat surface of said support, and a second end having a disc constructed and arranged for axial engagement by said compression means to draw said first and second flat surfaces together in a clamped relationship;
and a second hollow filter cartridge including a first end cap with a lip positioned so as to extend transversely between said first and second flat surfaces for gripping thereby when said surfaces are drawn together.

6. An air cleaner comprising, in combination:
a support having an axis, an axial air flow conduit, and compression means extending along the axis;
a first hollow filter cartridge having a flat surface extending generally transversely of said axis, with said compression means positioned so as to extend substantially through said first filter cartridge;
clamping means for securing said first filter cartridge to said support, and having a second flat surface apposed to the first-named surface;
and a second hollow filter cartridge including an end cap with a lip positioned so as to extend between said flat surfaces for gripping thereby when said flat surfaces are drawn together.

* * * * *